(12) United States Patent
Muller

(10) Patent No.: US 9,785,342 B2
(45) Date of Patent: Oct. 10, 2017

(54) ENHANCED GRAPHICAL DISPLAY FOR HAND-HELD DEVICES

(75) Inventor: Michael Muller, Cambridge, MA (US)

(73) Assignee: International Business Machines Corporation, Armonk, NY (US)

(*) Notice: Subject to any disclaimer, the term of this patent is extended or adjusted under 35 U.S.C. 154(b) by 833 days.

(21) Appl. No.: 12/651,248

(22) Filed: Dec. 31, 2009

(65) Prior Publication Data

US 2011/0161870 A1 Jun. 30, 2011

(51) Int. Cl.

| | |
|---|---|
| *G06F 3/00* | (2006.01) |
| *G06F 3/048* | (2013.01) |
| *G06F 3/0488* | (2013.01) |
| *G06F 3/0481* | (2013.01) |
| *G06F 3/0485* | (2013.01) |

(52) U.S. Cl.
CPC ........ *G06F 3/04883* (2013.01); *G06F 3/0481* (2013.01); *G06F 3/0485* (2013.01); *G06F 2203/04806* (2013.01)

(58) Field of Classification Search
None
See application file for complete search history.

(56) References Cited

U.S. PATENT DOCUMENTS

| 5,515,486 A * | 5/1996 | Amro et al. ................. 715/848 |
| 5,812,128 A * | 9/1998 | Sterling, IV ................. 715/762 |
| 5,883,625 A * | 3/1999 | Crawford et al. ............ 715/788 |
| 5,909,217 A * | 6/1999 | Bereiter ........................ 715/854 |
| 6,016,145 A * | 1/2000 | Horvitz et al. ............... 715/788 |
| 6,377,285 B1 * | 4/2002 | Doan et al. ................... 715/764 |
| 6,621,509 B1 * | 9/2003 | Eiref et al. .................... 715/836 |
| 6,628,313 B1 * | 9/2003 | Minakuchi et al. .......... 715/853 |
| 7,165,228 B2 * | 1/2007 | Taylor et al. ................. 715/788 |
| 7,180,500 B2 * | 2/2007 | Marvit et al. ................. 345/156 |
| 7,327,349 B2 * | 2/2008 | Robbins et al. .............. 345/156 |
| 7,412,650 B2 * | 8/2008 | Gallo ............................ 715/700 |
| 8,001,476 B2 * | 8/2011 | Gallo ............................ 715/742 |
| 8,056,014 B2 * | 11/2011 | Brockway et al. ........... 715/788 |
| 8,205,171 B2 * | 6/2012 | Chen et al. ................... 715/853 |
| 8,219,927 B2 * | 7/2012 | Gatlin et al. .................. 715/788 |
| 2002/0163546 A1 * | 11/2002 | Gallo ............................ 345/848 |
| 2002/0186262 A1 * | 12/2002 | Itavaara et al. ............... 345/864 |
| 2004/0070612 A1 * | 4/2004 | Sinclair et al. ............... 345/762 |
| 2005/0210399 A1 * | 9/2005 | Filner et al. .................. 715/767 |

(Continued)

*Primary Examiner* — Yongjia Pan
(74) *Attorney, Agent, or Firm* — Steven M. Greenberg, Esq.; CRGO Law

(57) ABSTRACT

Embodiments of the present invention provide a method, system and computer program product for a flexible grid user interface for a handheld device. In an embodiment of the invention, a flexible grid display management method can be provided. The method can include generating a grid of different cells in a user interface in a handheld device, each cell linking to an application or content for an application. The method also can include displaying the grid in the user interface in the handheld device and receiving an event directing a zooming operation on the grid. Finally, the method can include performing the zooming operation on the grid responsive to the event directing a zooming operation. Optionally, the method also can include receiving an event directing a panning operation on the grid performing the panning operation on the grid responsive to the event directing a panning operation.

10 Claims, 2 Drawing Sheets

(56) References Cited

U.S. PATENT DOCUMENTS

| | | |
|---|---|---|
| 2005/0210417 A1* | 9/2005 | Marvit et al. ............... 715/863 |
| 2006/0010395 A1* | 1/2006 | Aaltonen ..................... 715/779 |
| 2006/0156228 A1* | 7/2006 | Gallo et al. ................. 715/523 |
| 2006/0161863 A1* | 7/2006 | Gallo ........................... 715/810 |
| 2007/0011702 A1* | 1/2007 | Vaysman ...................... 725/45 |
| 2008/0092039 A1* | 4/2008 | Brockway et al. ........... 715/246 |
| 2009/0073132 A1* | 3/2009 | Lee et al. ..................... 345/173 |
| 2010/0058214 A1* | 3/2010 | Singh et al. ................. 715/769 |
| 2010/0138295 A1* | 6/2010 | Caron et al. ............... 705/14.49 |
| 2011/0107265 A1* | 5/2011 | Buchanan et al. ........... 715/835 |
| 2011/0227857 A1* | 9/2011 | Chaudhri ..................... 345/173 |

\* cited by examiner

ENHANCED GRAPHICAL DISPLAY FOR HAND-HELD DEVICES

BACKGROUND OF THE INVENTION

Field of the Invention

The present invention relates to hand-held phone display management and more particularly to the arrangement of icons in a display of a hand-held device.

Description of the Related Art

The conventional graphical user interface (GUI) has been widely used for many years. The primary function of the GUI includes providing user interface controls with which the end user can interact with an underlying application. The common GUI includes many stock user interface controls, most of which, when combined, can accommodate most computer human interactions required by an application. For example, the static text box control can be used to present text to the end user while an edit box can permit the user to provide textual input to the application. A radio button control can provide for the exclusive selection of an element from among a field of elements, and, of course, a menu bar can provide a selection of drop down menus with menu entries logically linked to programmatic functions of an underlying application.

When user interface controls are displayed in a GUI, often one must compromise between the amount of information that can be displayed within the GUI display, and the amount of displayable space within the GUI display in which a preferred amount of information can be presented. Where the display area must be reduced due to height and width constraints, information that otherwise might be easily grouped and viewed in within a larger display space often cannot be presented as a single, cohesive set of interrelated interface controls. This circumstance has been known to arise in the use of pervasive devices, including handheld computers and portable cellular telephones. In the case of pervasive devices, the display area sometimes can be limited to as little as a one-hundred sixty (160) pixel by 160 pixel region or less.

The handheld computing device, as a pervasive device, suffers the same display constraints. To address the constraints of a limited display, several conventional handheld computing devices employ a grid type display of application icons as the primary user interface control for the handheld device. The grid type display includes a fixed grid into which application icons are placed. Applications are accessed through a keypad or touch screen selection of the icon. Though the applications can be sorted in the grid in a number of ways, the cells of the grid are always populated in a left-to-right, top-to-bottom fashion leaving no cells unfilled in the process. The number of cells viewable at any given time cannot change, however, multiple different viewable frames of the same number of cells in the grid can be provided as pages in the handheld computing device.

Thus, it is to be recognized that the user interface paradigm of the grid, while efficient, also is limited. As a number of applications accessible through the handheld computing device increases, organizing the applications into different pages each of a fixed grid can become increasingly more difficult. In particular, locating an application of choice by the end user then involves tedious page turning of grid views seeking out the application of choice.

BRIEF SUMMARY OF THE INVENTION

Embodiments of the present invention address deficiencies of the art in respect to organizing application icons in a grid type user interface of a handheld device and provide a novel and non-obvious method, system and computer program product for a flexible grid user interface for a handheld device. In an embodiment of the invention, a flexible grid display management method can be provided. The method can include generating a grid of different cells in a user interface in a handheld device, each cell linking to an application or content for an application. The method also can include displaying the grid in the user interface in the handheld device and receiving an event directing a zooming operation on the grid. Finally, the method can include performing the zooming operation on the grid responsive to the event directing a zooming operation. Optionally, the method also can include receiving an event directing a panning operation on the grid performing the panning operation on the grid responsive to the event directing a panning operation.

In one aspect of the embodiment, generating a grid of different cells in a user interface includes both loading a template of a grid formed of cells in a specified shape and also generating the grid to conform to the template. In particular, loading a template of a grid formed of cells in a specified shape includes loading a template of a grid formed of cells in a specified shape of a letter. Alternatively, loading a template of a grid formed of cells in a specified shape includes loading a template of a grid formed of cells in a specified shape of a set of letters.

In another aspect of the embodiment, receiving an event directing a zooming operation on the grid includes receiving a finger trace of a letter corresponding to a grid shaped like the finger traced letter and interpreting the finger trace of the letter as an event directing a zooming operation on a grid corresponding to the grid shaped like the finger traced latter. In yet another aspect of the embodiment, receiving an event directing a zooming operation on the grid includes receiving an event directing a zooming operation on the grid at a specific zoom level.

In another embodiment of the invention, a handheld device is provided. The handheld device can include at least one processor, memory and a display. The handheld device also can include an operating system executing by the processor in the memory. Further, the handheld device can include a graphical user interface generated by the operating system in the display and a flexible grid disposed in the graphical user interface. Finally, the handheld device can include a flexible grid display management module coupled to the flexible grid and the graphical user interface. The module can include program code enabled to generate a grid of different cells in the graphical user interface, each cell comprising a link to an application or content for an application, to direct the display of the grid in the graphical user interface, to receive an event directing a zooming operation on the grid, and to perform the zooming operation on the grid responsive to the event directing a zooming operation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a flexible grid user interface for a handheld device. In accordance with an embodiment of the invention, a handheld device can be programmed with a flexible grid user interface. The flexible grid user interface can include a grid of multiple different cells. The size of the grid can exceed the physical display of the handheld device such that only a subset of the grid can be viewed, but obscured portions of the grid can be viewed through the display by panning from left to right, right to left, top to bottom, bottom to top or diagonally across the grid. Further, the display of the grid can permit zooming into an enlarged portion of the grid, or zooming out to a shrunken portion of the grid. Of note, the cells of the grid can be configured into a pre-arranged shape according to a template. In this regard, the pre-arranged shape can include a shape that is recognizable such as a letter or letters of the alphabet. By providing the flexibility of zooming and panning across a grid of substantial size, a flexible grid user interface can be provided for use in managing a multiplicity of application icons.

Figure 1A:
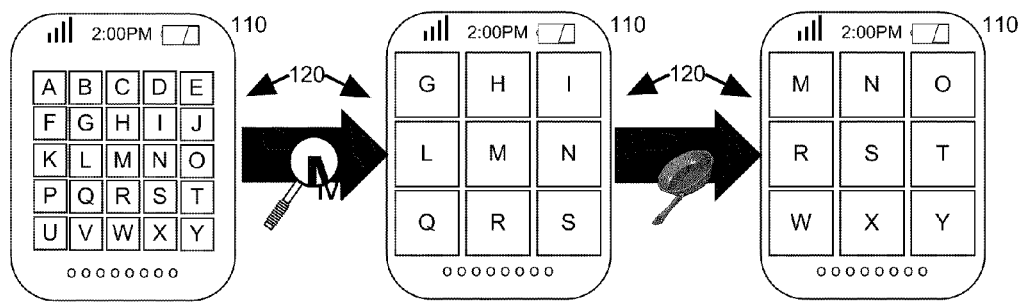
FIGS. 1A through 1C, taken together, are a pictorial illustration of a process for managing a flexible grid user interface for a handheld device.
Figure 1B:
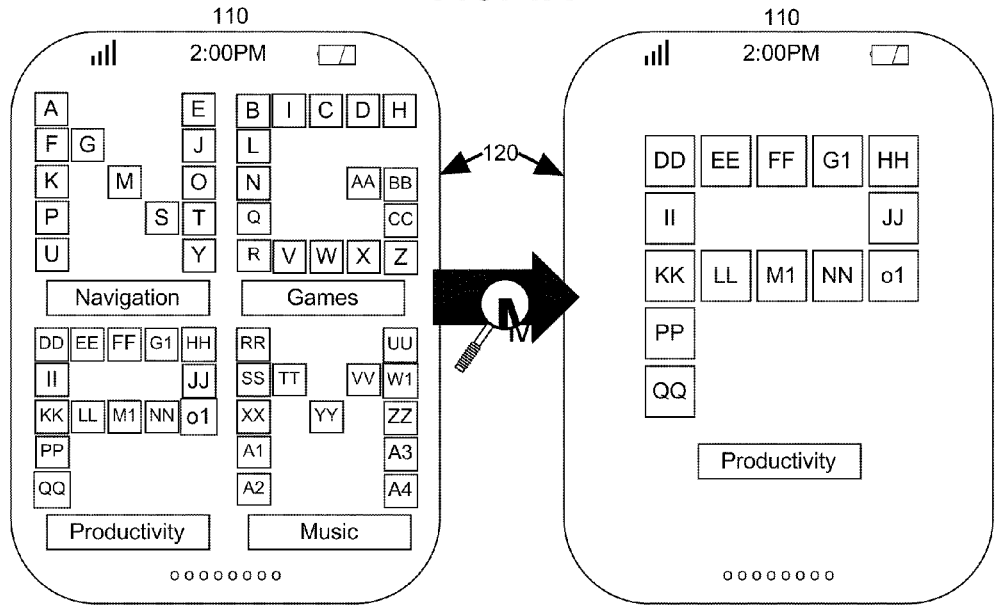
Figure 1C:
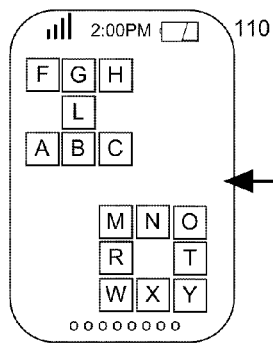

In further illustration, FIGS. 1A through 1C, taken together, are a pictorial illustration of a process for managing a flexible grid user interface for a handheld device. As shown in FIG. 1A, a handheld device 110 can provide a grid 120 for a user interface. The grid 120 can include multiple different cells, each linking to a different application or content to be opened by an application such that the activation of a cell in the grid 120, such as a tap or touch, results in the launching of the linked application or the linked content in an associated application. The grid 120 can be zoomable in that through a user interface gesture such as a double tap or touch, a smaller subset of the cells in the grid 120 than contemporaneously displayed can be viewed larger in size (zooming in), or a larger subset of the cells (and at the extreme—all of the cells) can be displayed smaller in size (zooming out).

Yet further, the grid 120 can be pannable. Specifically, through a user interface gesture such as a directional swipe, a view to the grid 120 can be panned in the direction indicated by the gesture. Optionally, both a pan and zoom can result from a zoom operation. In this regard, during a zoom operation, a selected one of the cells in the grid can become the focal point of the display resulting in a pan operation to move the view to the grid 120 in a position where the selected one of the cells in the grid is centered in the display of the handheld device 110.

Figure 2:
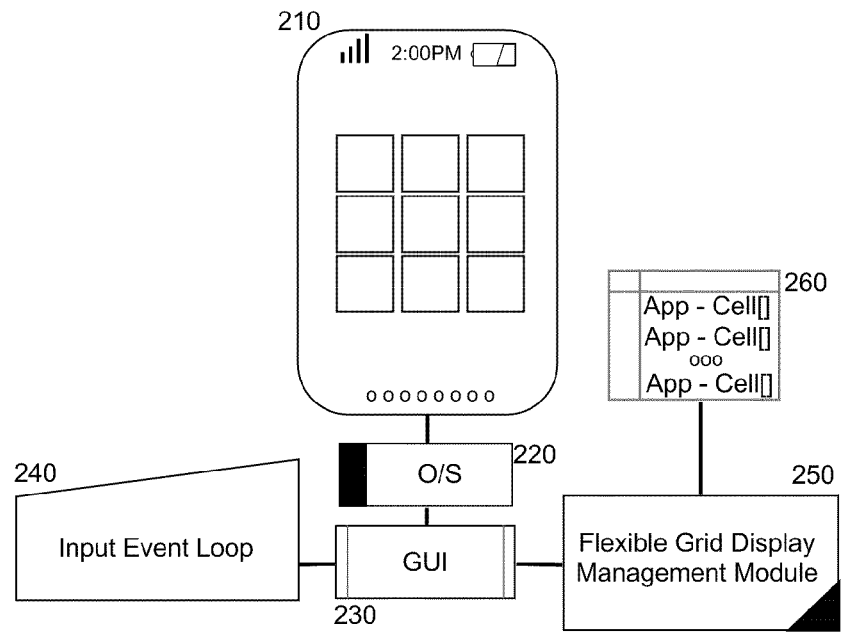
FIG. 2 is a schematic illustration of a handheld device configured with a flexible grid user interface; and, FIG. 3 is a flow chart illustrating a process for managing a flexible grid user interface for a handheld device.

Referring now to FIG. 1B, the grid 120 is not limited to a mere square shape. Rather, a template of cells in the grid 120 can be predefined to create a shape. For example, the shape can be the shape of a letter. The letter, in turn, can be representative of a classification of application or content types grouped together in the grid 120. Multiple different grids 120 then can be placed in the same display of the handheld device 110, each with a different templated shape as shown in FIG. 1B. Selecting an individual grid 120 or even the title to an individual grid 120 can result in the zooming-in operation just to show the individual grid 120 as shown in FIG. 2. Alternatively, performing a zooming-out operation in general can result in the cells of the individual grids 120 becoming too small to recognize, however, the shape of each of the individual grids 120 can remain comprehensible to indicate to the end user the nature of the applications and application content linked by the cells of the individual grids 120.

The templated shapes of FIG. 1B can be both created and also edited by an end user through a grid template editor (not shown). In the grid template editor, the end user can specify a grid size in terms of maximum height and width such as 4×4 or 5×7, etc. Thereafter, the grid template editor can display a grid of the specified size and the end user can mark different cells in the grid to form a pattern. The resulting pattern can be saved as a grid template in which cells are provided only where previously marked in the editor.

Of note, with respect to FIG. 1C, a default template for the display of the handheld device 110 can be provided. The default template can include a shaped form of the grid 120, such as a series of letters or a logo. For instance, the default template can set forth a brand logo, company name or acronym. As an additional option, though not illustrated, responsive to detecting a touch screen gesture in the shape of a letter, a grid conforming to the shape of the letter can be set as a focal point and a zooming operation can be performed on that grid. As an even further option, specific gestures in the handheld device can be correlated to a zooming operation to zoom to a specified zoom level on the grid 120.

The grid user interface described in connection with FIGS. 1A through 1C can be implemented in a handheld device. In yet further illustration, FIG. 2 schematically shows a handheld device configured with a flexible grid user interface. The handheld device 210 can include at least one processor and memory supporting the execution of an operating system 220. The operating system 220 in turn can provide and manage a graphical user interface 230. The graphical user interface 230 can include an event loop 240 into which user interface events are trapped and processed. Those user interface events can include, by way of example, taps, touches, keystrokes, finger or stylus swipes, trackball movements, mouse clicks, and the like.

Of note, flexible grid display management module 250 can be coupled to the graphical user interface 230. The module 250 can include program code that, when executed in the memory by at least one of the processors of the handheld device 210, can be enabled to generate a grid that is both zoomable and pannable. The program code further can be enabled to generate the grid to conform to a predefined template, such as a template defining a template in the shape of a logo or character (letter). The program code yet further can be enabled to maintain an awareness of the linkages between each cell in the grid and a corresponding application or content for an application in a table or list 260 in the memory of the handheld device 210.

Figure 3:
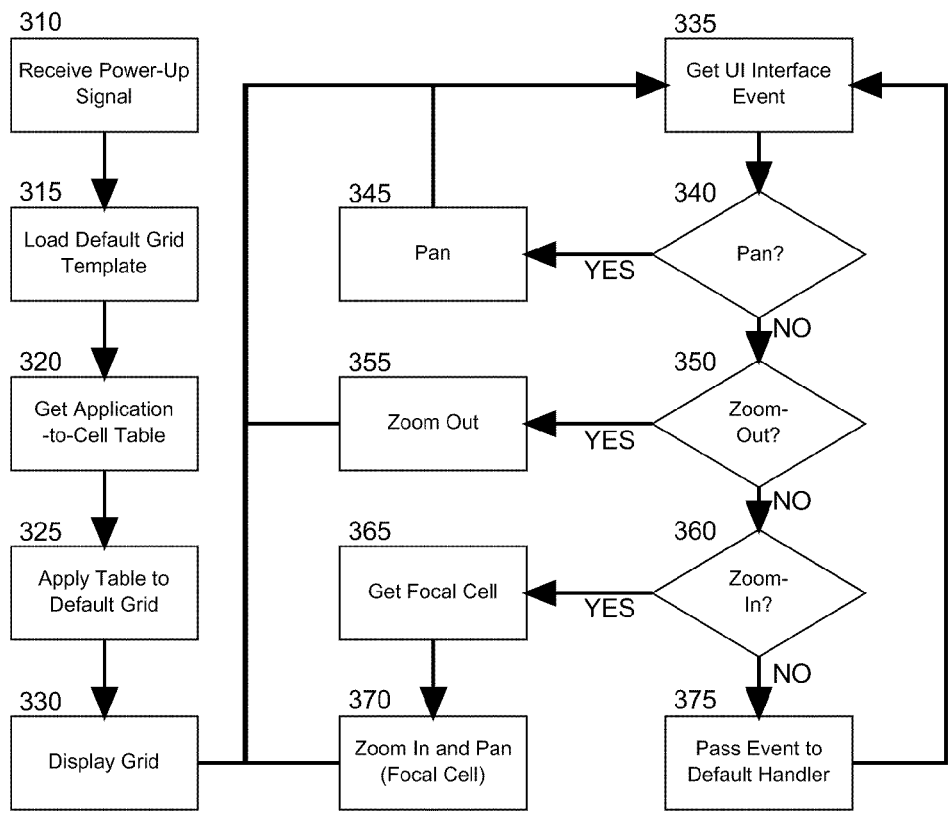

In even yet further illustration of the operation of the flexible grid display management module 250, FIG. 3 is a flow chart illustrating a process for managing a flexible grid user interface for a handheld device. Beginning in block 310, a power up signal can be received in the handheld device indicating an intent to render a grid display in a graphical user interface for an operating system of the handheld device. In block 315, a default grid template can be loaded for the graphical user interface, for example a template defining one or more grids, each of a different shape. In block 320, an application-to-cell table can be consulted to determine which of the different cells of the grids to link to the different applications or application content. Of note, multiple different cells in different grids can be linked to the same application or application content. In any event, in block 325, the table can be applied to the grid and in block 330 the grid can be displayed in the handheld device.

In block 335, a user interface event can be received in connection with the user interface of the handheld device. In decision block 340, it can be determined whether or not the event is a pan event. If so, in block 345, the user interface can pan across the grid or grids in a direction indicated by the event. Otherwise, in decision block 350 it can be determined whether or not the event is a zoom-out event. If so, in block 355 the user interface can reveal more cells in the grid, each cell being of a smaller size in order to reveal more cells in the grid in the user interface of the handheld device. Otherwise, in decision block 360 it can be determined whether or not the event is a zoom-in event. If so, in block 365 a focal cell can be determined—that is a cell in the grid having current focus. Thereafter, in block 370 a pan operation can be performed to place the focal cell towards the middle of the graphical user interface and the user interface can reveal fewer cells in the grid, each cell being of a larger size in order to reveal fewer cells in the grid in the user interface of the handheld device. Otherwise, in block 375 the event can be passed to the default handler for user interface events for the graphical user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. With specific reference to a computer readable storage medium, it is to be understood that a storage medium excludes transitory media such as transitory signals and other propagation media.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A flexible grid display management method comprising:
    generating a grid of multiple different cells in a user interface in a handheld device by loading a template of a grid formed of multiple different cells in a specified shape of one or more letters of the alphabet and generating the grid of the multiple different cells to conform to the template, each of the cells comprising a link to an application or content for an application;
    displaying the grid in the user interface in the handheld device;
    receiving an event directed to the grid of the multiple different cells that directs a zooming operation on the grid of the multiple different cells; and,
    performing the zooming operation on the grid of the multiple different cells responsive to the event directing the zooming.

2. The method of claim 1, further comprising:
    receiving an event directing a panning operation on the grid of the multiple different cells; and,
    performing the panning operation on the grid of the multiple different cells responsive to the event directing a panning operation.

3. The method of claim 1, wherein receiving the event directed to the grid of the multiple different cells that directs the zooming operation on the grid of the multiple different cells, comprises receiving a finger trace of a letter corresponding to a grid of multiple different cells shaped like the finger traced letter and interpreting the finger trace of the letter as an event directing a zooming operation on the grid of the multiple different cells corresponding to the grid of the multiple different cells shaped like the finger traced letter.

4. The method of claim 1, wherein receiving the event directed to the grid of the multiple different cells that directs the zooming operation on the grid of the multiple different cells, comprises receiving an event directing a zooming operation on the grid of the multiple different cells at a specific zoom level.

5. A handheld device comprising:
    at least one processor, memory and a display;
    an operating system executing by the at least one processor in the memory;
    a graphical user interface generated by the operating system in the display;
    a flexible grid disposed in the graphical user interface and,
    a flexible grid display management module coupled to the flexible grid and the graphical user interface, the module comprising program code enabled to generate a grid of multiple different cells in the graphical user interface by loading a template of a grid formed of multiple different cells in a specified shape of one or more letters of the alphabet and generating the grid of the multiple different cells to conform to the template, each of the cells comprising a link to an application or content for an application, to direct the display of the grid in the graphical user interface, to receive an event directed to the grid of the multiple different cells that directs a zooming operation on the grid of the multiple different cells, and to perform the zooming operation on the grid of the multiple different cells responsive to the event directing zooming.

6. The system of claim 5, wherein the program code is further enabled to receive an event directing a panning operation on the grid of the multiple different cells, and to perform the panning operation on the grid of the multiple different cells responsive to the event directing a panning operation.

7. A computer program product comprising a computer readable storage medium storing computer readable program code for flexible grid display management, the computer program product comprising:
    computer readable program code for generating a grid of multiple different cells in a user interface in a handheld device by loading a template of a grid formed of multiple different cells in a specified shape of one or more letters of the alphabet and generating the grid of the multiple different cells to conform to the template, each of the cells comprising a link to an application or content for an application;
    computer readable program code for displaying the grid in the user interface in the handheld device;

computer readable program code for receiving an event directed to the grid of the multiple different cells that directs a zooming operation on the grid of the multiple different cells; and, computer readable program code for performing the zooming operation on the grid of the multiple different cells responsive to the event directing the zooming.

8. The computer program product of claim 7, further comprising:

computer usable program code for receiving an event directing a panning operation on the grid of the multiple different cells; and, computer usable program code for performing the panning operation on the grid of the multiple different cells responsive to the event directing a panning operation.

9. The computer program product of claim 7, wherein the computer usable program code for receiving the event directed to the grid of the multiple different cells that directs the zooming operation on the grid, comprises computer usable program code for receiving a finger trace of a letter corresponding to a grid of multiple different cells shaped like the finger traced letter and interpreting the finger trace of the letter as an event directing a zooming operation on the grid of the multiple different cells corresponding to the grid of the multiple different cells shaped like the finger traced letter.

10. The computer program product of claim 7, wherein the computer usable program code for receiving the event directed to the grid of the multiple different cells that directs the zooming operation on the grid of the multiple different cells, comprises computer usable program code for receiving an event directing a zooming operation on the grid of the multiple different cells at a specific zoom level.

\* \* \* \* \*